(12) United States Patent
Cargill

(10) Patent No.: US 6,481,784 B2
(45) Date of Patent: Nov. 19, 2002

(54) PICKUP TRUCK TENT CAMPING SYSTEM

(75) Inventor: Lee B. Cargill, Coronado, CA (US)

(73) Assignee: ENEL Company, Coronado, CA (US)

( * ) Notice: Subject to any disclaimer, the term of this patent is extended or adjusted under 35 U.S.C. 154(b) by 0 days.

(21) Appl. No.: 09/783,661

(22) Filed: Feb. 14, 2001

(65) Prior Publication Data

US 2002/0109374 A1 Aug. 15, 2002

Related U.S. Application Data

(60) Provisional application No. 60/241,160, filed on Oct. 18, 2000.

(51) Int. Cl.[7] .......................... E04H 15/06; B60R 13/01; B62D 33/02; B60P 3/32
(52) U.S. Cl. ...................... 296/159; 296/164; 296/183; 296/37.2; 135/88.13
(58) Field of Search ................................ 296/156, 159, 296/164, 183, 39.2, 39.1; 135/88.01, 88.13

(56) References Cited

U.S. PATENT DOCUMENTS

| | | | | |
|---|---|---|---|---|
| 4,310,194 A | * | 1/1982 | Biller ......................... | 296/159 |
| 4,465,087 A | * | 8/1984 | Ferguson .................... | 135/138 |
| 4,652,040 A | * | 3/1987 | Mahan ........................ | 296/159 |
| 4,875,731 A | * | 10/1989 | Ruiz .......................... | 296/157 |
| 5,018,778 A | * | 5/1991 | Goble ........................ | 296/159 |
| 5,118,156 A | * | 6/1992 | Richard ...................... | 296/37.6 |
| 5,299,849 A | * | 4/1994 | Cook et al. ............... | 135/88.09 |
| 5,339,851 A | * | 8/1994 | Miller et al. ............. | 135/88.05 |
| 5,419,607 A | * | 5/1995 | Oliveira ..................... | 296/159 |
| 5,924,761 A | * | 7/1999 | Harrison .................... | 296/159 |
| 5,954,076 A | * | 9/1999 | McGinnis ................. | 135/88.13 |
| 5,988,195 A | * | 11/1999 | Kaestner et al. ......... | 135/88.13 |
| 6,030,026 A | * | 2/2000 | Vega et al. ................ | 296/159 |
| 6,283,537 B1 | * | 9/2001 | DeVore, III ................ | 296/181 |
| 2002/0008406 A1 | * | 1/2002 | Phillips et al. ............. | 296/164 |

OTHER PUBLICATIONS

Target advertisement, p. 12; "Eddie Bauer side Room Dome Tent", Feb. 2002.*

* cited by examiner

Primary Examiner—D. Glenn Dayoan
Assistant Examiner—Hilary Gutman
(74) Attorney, Agent, or Firm—John L. Rogitz

(57) ABSTRACT

A pickup truck tent camping system includes a platform assembly that is installed in the cargo box of the pickup truck such that it is suspended above the floor of the cargo box to establish storage space beneath the platform assembly. A tent assembly is installed over the platform assembly from the forward wall of the cargo box, across the length of the cargo box, and across the cargo box tailgate in the open position. A tent cover is installed over the tent assembly to provide additional protection from wind and rain. The tent cover also provides shade for the tent assembly. The tent cover includes a seam located near its midpoint that can be opened to expose side screens incorporated into the tent assembly. The pickup truck tent camping system also includes a travel cover that can be attached to a pair of rails installed along the top of the cargo box to protect the tent and any other camping gear while traveling to and from a campsite.

25 Claims, 6 Drawing Sheets

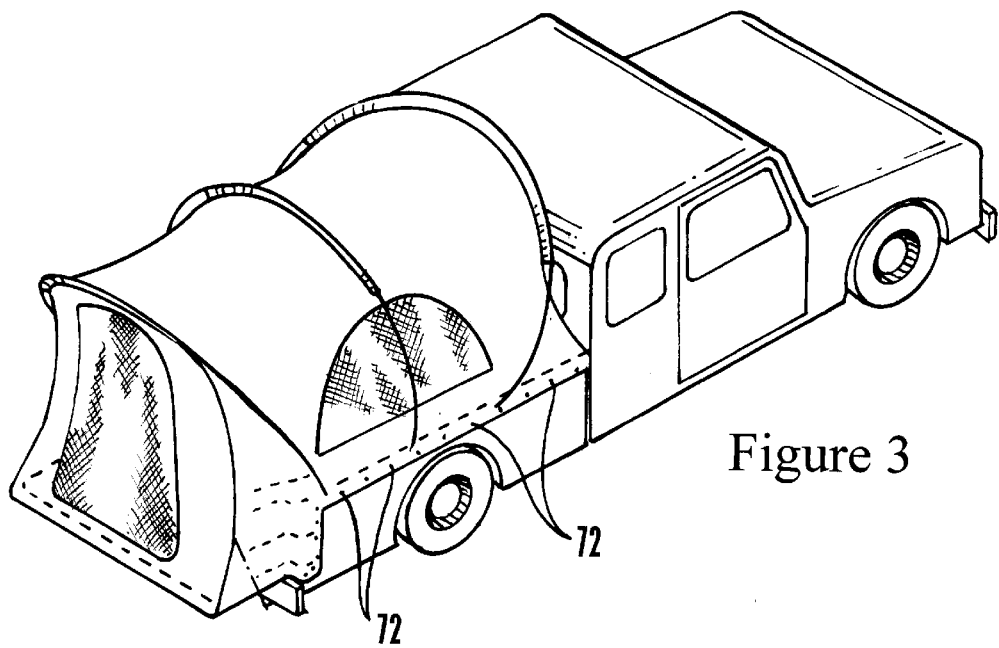
Figure 3
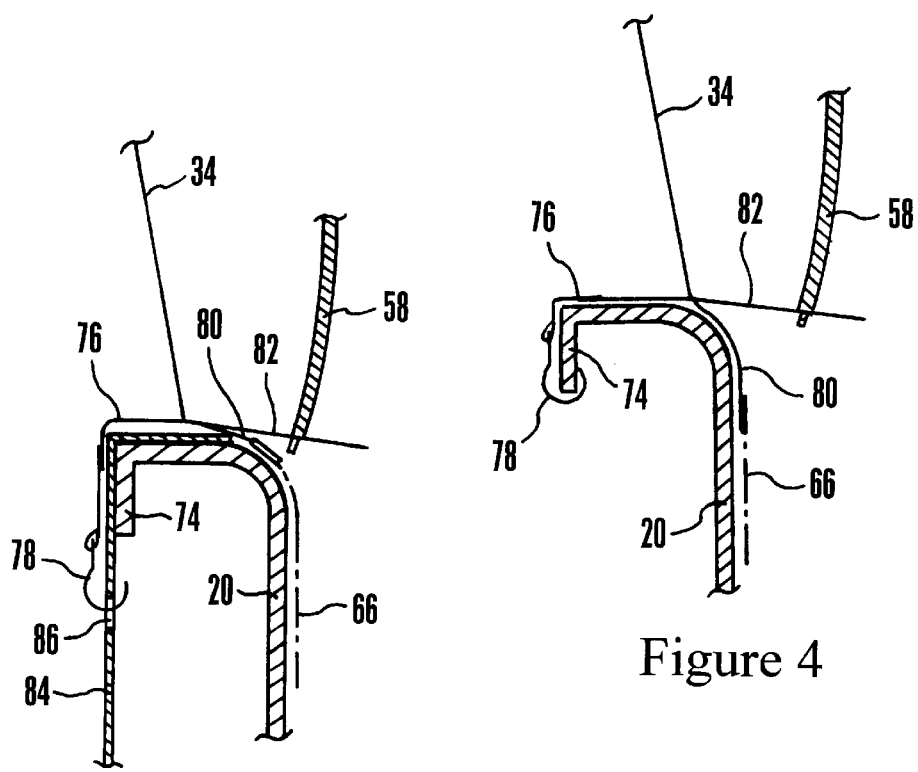
Figure 5
Figure 4

PICKUP TRUCK TENT CAMPING SYSTEM

RELATED APPLICATIONS

The present application claims priority from provisional U.S. patent application Ser. No. 60/241,160 filed Oct. 18, 2000.

TECHNICAL FIELD

The present invention relates generally to camping equipment.

BACKGROUND OF THE INVENTION

Pickup truck mounted enclosures that are used to provide temporary shelter while camping are well known. A majority of these enclosures are heavy rigid structures that are semi-permanently attached to the cargo box of a pickup truck. Collapsible rigid enclosures, i.e., "pop-up" campers, have been provided that include rigid panels that fold into a low profile for travel and then unfold, or pop-up, to form a camping enclosure. Unfortunately, these rigid enclosures are extremely heavy, difficult to install on a pickup truck, difficult to remove from a pickup truck, and relatively expensive.

Soft enclosures, i.e., tents, that are mountable in the cargo box of a pickup truck have also been provided. Typically, these tents are limited in size to the length of the cargo box with the tailgate in the vertical, or closed, position. Other tents have been provided that are partially attached to the cargo box and partially attached to the ground. Each of these tents are quite complex and takes a substantial amount of time to erect. Moreover, these tents tend to become quite hot in direct sunlight and do not provide adequate shelter from rain and wind. Also, these tents do not provide adequate storage space.

The present invention has recognized these prior art drawbacks, and has provided the below-disclosed solutions to one or more of the prior art deficiencies.

SUMMARY OF THE INVENTION

The present invention includes a tent assembly that can be removably attached to the cargo box of a pickup truck. The cargo box includes a left sidewall and a right sidewall. A forward wall and a tailgate are installed between the sidewalls at opposite ends of the cargo box. Moreover, the tent assembly includes a center section that defines a top, a left sidewall, and a right sidewall. Each sidewall includes an inner side flap and an outer side flap that can be draped over respective cargo box sidewalls and then, attached thereto. The tent sidewalls extend from the forward wall of the cargo box, along the length of the cargo box sidewalls, and across the tailgate, when it is in an open horizontal position. The tent assembly also includes a horizontal flap that is connected between the tent sidewalls such that it is beneath the open tailgate.

In a preferred embodiment, the tent assembly includes a forward tent pole sleeve that has a forward tent pole disposed therein. Preferably, the forward tent pole is inclined forward at an angle with respect to the vertical when the tent assembly is erected in the cargo box. The tent assembly also includes a center tent pole sleeve that has a center tent pole sleeve disposed therein and an aft tent pole sleeve that has an aft tent pole sleeve disposed therein. In a preferred embodiment, the aft tent pole sleeve is inclined aft with respect to the vertical when the tent assembly is erected in the cargo box.

In the presently preferred embodiment of the invention described below, the forward tent pole angle is inclined at an angle of between ten degrees to thirty degrees (10°–30°) and the aft tent pole angle is inclined at an angle of between ten degrees to thirty degrees (10°–30°). The center tent pole is perpendicular to the horizontal.

In a typical cargo box, each sidewall includes an interior lip and the inner flap includes plural hooks that extend from it. The hooks are used to hook each inner flap to the interior lip of each sidewall. Some pickup trucks, on the other hand, can include a cargo box liner installed within the cargo box. As such, the cargo box can be formed with plural holes, and the hooks, that extend from the inner flap, can be inserted into the holes to fasten each inner flap to the cargo box liner. Preferably, the tent assembly includes plural restraint lines that connect the outer flaps to the cargo box.

In a preferred embodiment, the tent assembly includes a forward section and an aft section that are attached to the center section to enclose the center section of the tent assembly. Moreover, a side screen is incorporated into each sidewall of the center section and an aft screen is incorporated into the aft section of the tent assembly.

In another aspect of the present invention, a pickup truck tent camping system is used in conjunction with a pickup truck that has a cargo box. The tent camping system includes a platform assembly installed in the cargo box. A tent assembly is installed over the platform assembly. Additionally, a tent cover is installed over the tent assembly.

In yet another aspect of the present invention, a pickup truck tent camping system is used in conjunction with a pickup truck. The tent camping system includes cargo box means and tent means covering the cargo box means. Flap means hold the tent means onto the cargo box means.

The present invention will now be described, by way of example, with reference to the accompanying drawings, in which:

BRIEF DESCRIPTION OF THE DRAWINGS

FIG. 3 is a perspective view of a pickup truck with an alternative tent assembly installed within the cargo box;

FIG. 4 is a detail view of a connection between the tent assembly and a typical cargo box;

FIG. 5 is a detail view of a connection between the tent assembly and a cargo box having a cargo box liner installed therein;

DESCRIPTION OF AN EMBODIMENT OF THE INVENTION

Figure 1:
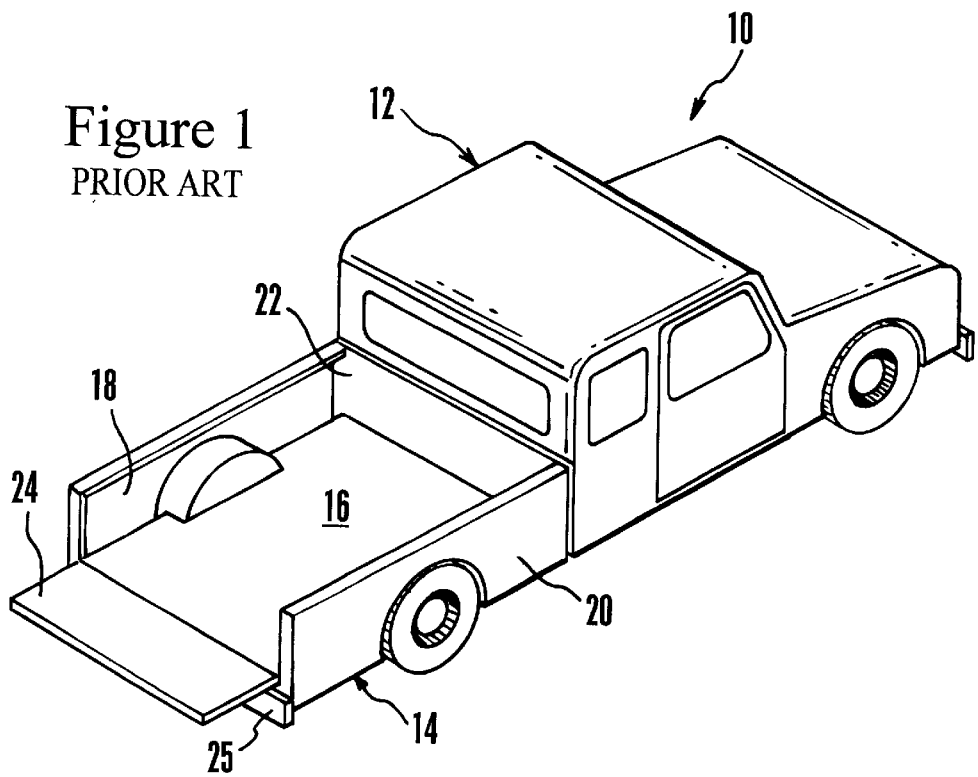
FIG. 1 is a perspective view of a pickup truck.

Referring initially to FIG. 1, a pickup truck is shown and generally designated 10. FIG. 1 shows that the pickup truck includes a cab 12 and a cargo box 14. As shown, the cargo box 14 includes a cargo box floor 16 having a left vertical sidewall 18, a right vertical sidewall 20, and a forward wall 22 extending perpendicularly between the side walls 18, 20 form a generally box shape. It is to be understood that the sidewalls 18, 20 are parallel to each other. FIG. 1 further shows a cargo box tailgate 24 can be pivotably installed between the aft ends of the sidewalls 18, 20 such that the axis around which the tailgate 24 pivots is parallel to the forward wall 22 of the cargo box 14. The tailgate 24 is movable between a closed position, wherein the tailgate 24 is upright over the cargo box floor 16 and the end of the cargo box 14 is closed, and an open position, wherein the tailgate 24 is lowered and the end of the cargo box 14 is open. Beneath the tailgate 24 is a bumper 25.

Figure 2:
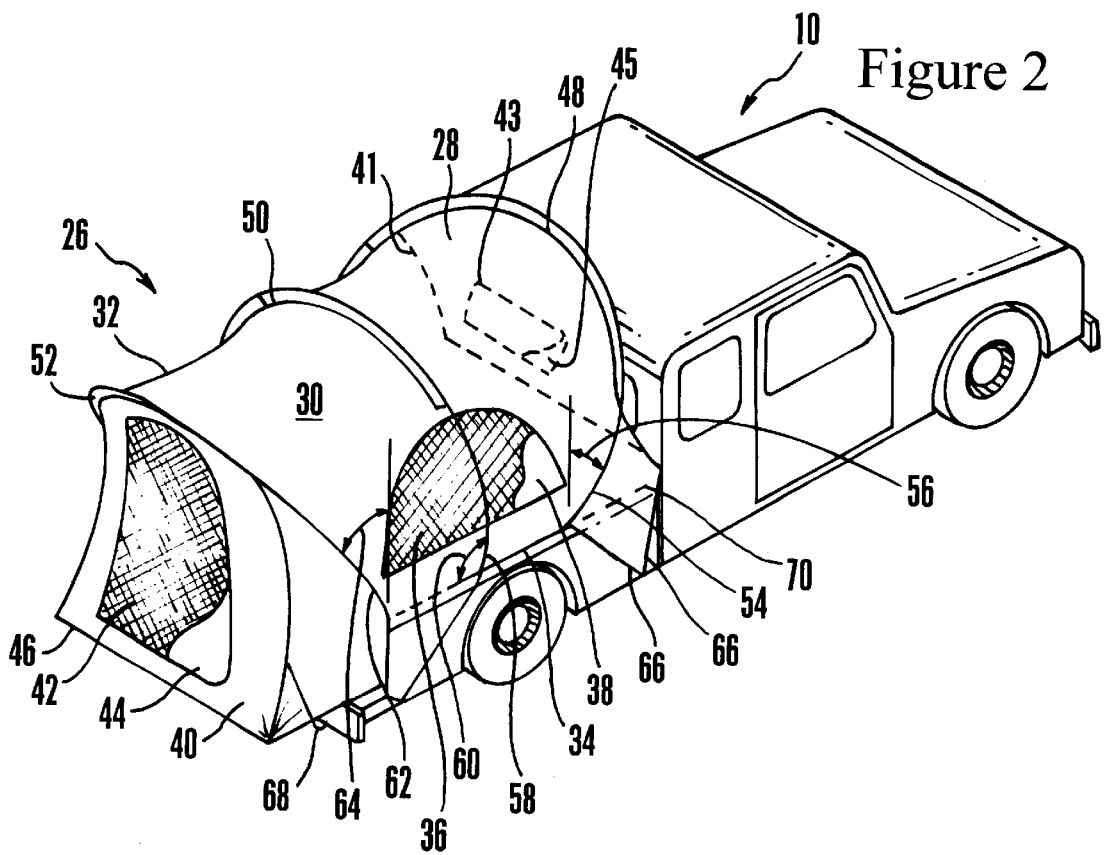
FIG. 2 is a perspective view of a pickup truck with a tent assembly installed within the cargo box.

Referring now to FIG. 2, a tent assembly, generally designated 26, is shown removably attached to the cargo box 14 of the pickup truck 10. In a preferred embodiment, the tent assembly 26 is manufactured from rain resistant material. FIG. 2 shows that the tent assembly 26 includes a generally inverted "U"-shaped center section 28 that defines a top 30, a left tent sidewall 32, and a right tent sidewall 34. As shown in FIG. 2, each tent sidewall 32, 34 extends along the entire length of the top of each cargo box sidewall 18, 20, down the end of each cargo box sidewall 18, 20, and along each side of the open tailgate 24. Each tent sidewall 32, 34 can include a screen 36 that allows air to enter the tent assembly 26, but prevents insects from doing so. Each screen 36 is backed by a zippered side vent panel 38 that can selectively cover its respective screen 36 to control the amount of air entering the tent assembly 26 and to prevent rain from entering the tent assembly 26.

FIG. 2 further shows that the tent assembly 26 includes a generally vertical aft section 40 that is sewn to the center section 28 in order to enclose the aft opening of the tent assembly 26. A generally vertical forward section 41 is also sewn to the center section 28 to enclose the forward opening of the tent assembly 26. As shown in FIG. 2, the aft section 40 of the tent assembly 36 includes an aft screen 42 incorporated therein. It is to be understood that the aft screen 42 is zippered around its outer periphery so that it may be opened to allow access to the interior of the tent assembly 26. The aft screen 42 is backed by a zippered door panel 44 that, like the zippered side vent panels 38, can selectively cover its respective screen 42 to control the amount of air entering the tent assembly 26 and to prevent rain from entering, as well. A forward screen 43 and a cab access panel 45 are incorporated into the forward section of the tent assembly 26.

Still referring to FIG. 2, the tent assembly 26 includes a horizontal flap 46 that is sewn to the left sidewall 32, the right sidewall 34, and the aft section 40. When the tent assembly 26 is installed on the cargo box 14 of the pickup truck, the horizontal flap 46 is placed underneath the open tail gate 24. As also shown in FIG. 2, the tent assembly 26 includes a forward tent pole sleeve 48, a center tent pole sleeve 50, and an aft tent pole sleeve 52. Slidably disposed within the forward tent pole sleeve 48 is a forward tent pole 54. As shown, the forward tent pole 54 is inclined forward from top of the cargo box 14 to form an angle 56 with respect to the vertical. Preferably, the angle 56 is in a range from ten degrees to thirty degrees (10°–30°). A center tent pole 58 is slidably disposed within the center tent pole sleeve 50. When the center tent pole 58 is properly installed, it establishes an angle 60 with respect to the horizontal. In a preferred embodiment, this angle 60 is approximately ninety degrees (90°). FIG. 2 also shows an aft tent pole 62 slidably disposed within the aft tent pole sleeve 52. The aft tent pole 62 is inclined aft from the top of the cargo box 14 to establish an angle 64 with respect to the vertical. Preferably, the angle 64 is in a range from ten degrees to thirty degrees (10°–30°). With this cooperation of structure, the tent poles 54, 62 advantageously hold the tent assembly 26 in tension, i.e., in a slightly stretched configuration.

It is to be understood that the tent poles 54, 58, 62 are flexible tent poles well known in the art. Accordingly, each tent pole 54, 58, 62 can include tubular tent pole sections that can be fitted together end to end. An elastic cord is installed through the tent pole sections. The cord is stretched and then attached to the ends of the tent pole. The tension in the cord compresses the tent pole sections and prevents the tent pole from easily coming apart although the sections can be disengaged by hand when desired to collapse the tent poles 54, 58, 62. When installed, each tent pole 54, 58, 62 is bent in an arc and prevents the center section 28 of the tent assembly 26 from collapsing.

As shown in FIG. 2 and further described, plural center restraint lines 66 partially attach the center section 28 of the tent assembly 26 to the cargo box 14. Aft restraint lines 68 are used to stay the aft end of the tent assembly 26. The aft restraint lines 68 are connected between the aft section 40 of the tent assembly 26 and the truck bumper. Preferably, each aft restraint line 68 is permanently attached, e.g, sewn, to the aft section 40 of the tent assembly 26 and each includes a hook that can be hooked to the bottom edge of the truck bumper 25. FIG. 2 shows that the tent assembly 26 further includes forward adjustment straps 70 that are used to adjust the tent assembly 26 so that it will fit snugly on cargo boxes 14 of varying sizes. Each adjustment strap 70 includes one end attached to the forward section of the tent assembly 26 and another end attached to the center section 28 of the tent assembly 26. A slider is installed along each adjustment strap 70 and can be used to adjust the distance between the ends of the strap 70. Thus, the corner of the tent assembly 26 can be cinched tightly around the corner of the cargo box 14. Referring briefly to FIG. 3, the tent assembly 26 may also be attached to the cargo box 14 by plural snap fasteners 72.

Referring now to FIG. 4, the remaining details concerning the means for connecting the tent assembly 26 to the pickup truck 10 are shown. For clarity, FIG. 4 focuses on the tent assembly connection point beneath the center tent pole 58 on the right side of the pickup truck 10. However, it is to be appreciated that all of the connection points between the center section 28 of the tent assembly 26 and the cargo box 14 are identical.

FIG. 4 shows that the sidewall 20 of the cargo box 14 forms an interior lip 74. The tent assembly 26 includes an inner side flap 76 that is draped over the interior lip 74 of the cargo box sidewall 20. A hook 78 is attached to the inner side flap 76 of the tent assembly 26 and fits over the interior lip 74 of the cargo box sidewall 20 to hold the tent assembly 26 to the pickup truck 10. As shown, the tent assembly 26 also includes an outer side flap 80 that drapes outwardly over the cargo box sidewall 20. One end of the center section restraint line 66 is attached to the exterior side flap 80 while the other hooks underneath the cargo box 14. FIG. 4 further shows a tent pole anchor strap 82 that is removably attached to the end of the tent pole 58 in order to support the end of the tent pole 58 and help it maintain the arc shape described above. It is to be understood that the inner and outer flaps 76, 80 may be attached to the cargo box by snap fasteners or similar means. Furthermore, it is to be understood that the front section of the tent assembly 26 includes an inner and outer side flap configuration, similar to that described above, that allows the front section of the tent assembly 26 to be attached to the front wall 22 of the cargo box 14, e.g., by restraint lines or snap fasteners.

FIG. 5 shows details of the means for connecting the tent assembly 26 to a pickup truck 10 having a cargo box liner 84. As shown in FIG. 5, the cargo box liner 84 is formed with a hole 86, e.g., by drilling therethrough, into which the hook 78 extending from the interior flap 76 is inserted. The remaining means for connecting the center section 28 of the tent assembly 26 to the cargo box 14 is the same as that described above in conjunction with FIG. 4. It is to be appreciated that the inner side flap 76 may be attached to the cargo box liner 84 by snap fasteners or similar means. Thus, the need to drill holes in the cargo box liner 84 would be eliminated.

Figure 6:
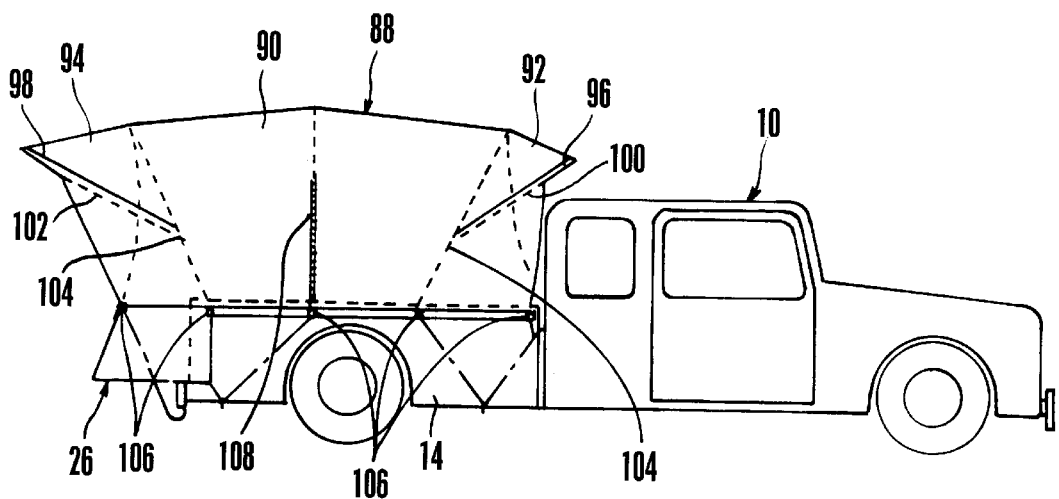
FIG. 6 is a side view of the pickup truck with a tent cover installed over the tent assembly.

Referring to FIG. 6, a tent cover, generally designated 88, is shown installed over the tent assembly 26. In a preferred embodiment, the tent cover 88 is manufactured from rain resistant material. FIG. 6 shows that the tent cover 88 includes a center tent cover section 90 having a forward tent cover extension 92 and an aft tent cover extension 94 extending therefrom to cover the entire top 30 of the tent assembly 26. During rain showers, the extensions 92, 94 prevent rain entering the tent assembly 26 through the forward and aft screens 42.

As shown in FIG. 6, the tent cover 88 includes a forward tent pole cover sleeve 96 and an aft tent cover pole sleeve 98 into which a forward tent cover pole 100 and an aft tent cover pole 102 are slidably disposed, respectively. The ends of the tent cover poles 100, 102 are anchored in tent cover pole grommets 104 that are located a few inches below the forward and aft tent pole sleeves 48, 52. When properly anchored in the grommets 104, the tent cover poles 100, 102 bend away from the center of the tent cover 88 to provide support for the tent cover extensions 92, 94. FIG. 6 also shows plural connectors 106 located along the bottom edge of the tent cover 88 to which the tent cover 88 is removably attached. These connectors 106 allow the tent cover 88 to be fastened tightly over the tent assembly 26 and prevent the tent cover 88 from blowing off the tent assembly 26 during high winds. Hook-and-loop material (not shown) is also used between the exterior of the tent assembly 26, e.g., along the tent pole sleeves 48, 50, 52, and the interior of the tent cover 88 to further prevent the tent cover 88 from being forcefully removed from the tent assembly 26 by strong winds.

Figure 7:
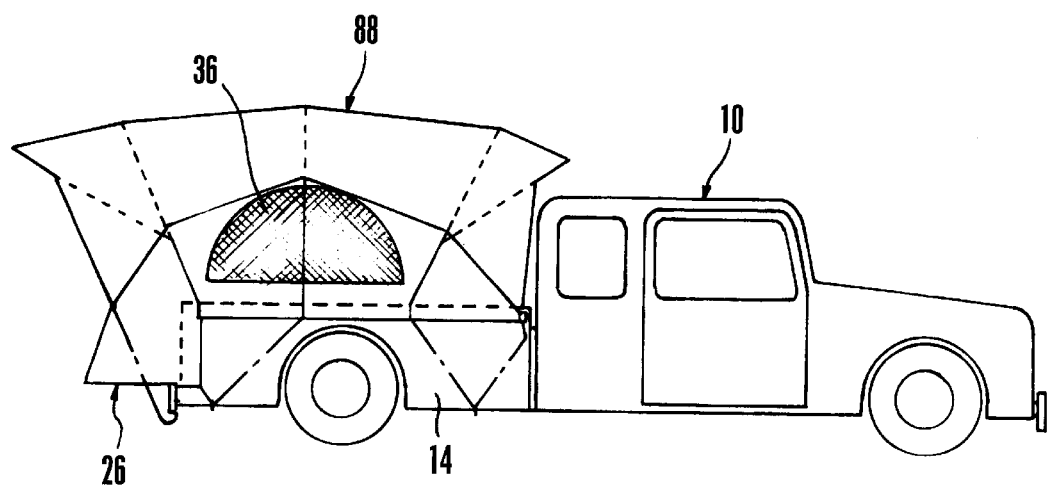
FIG. 7 is a side view of the pickup truck with the tent cover opened to expose the tent assembly.

Referring still to FIG. 6, a vertical seam 108 capable of being opened, e.g, through use of a zipper or hook-and-loop material, is incorporated into the tent cover 88 near its midpoint. The vertical seam 108 can be closed, as shown in FIG. 6, to provide protection against extreme weather conditions. On the other hand, as shown in FIG. 7, the seam 108 can be opened and the tent cover 88 folded back to expose the side screens 36 installed in the tent assembly 26. Thus, shade is provided for the tent assembly 26 while allowing increased airflow through the tent assembly 26. Moreover, since there is an air gap between the tent assembly 26 and the tent cover 88, the amount of heat transferred to the tent assembly 26 during sunny days is minimized.

Figure 8:
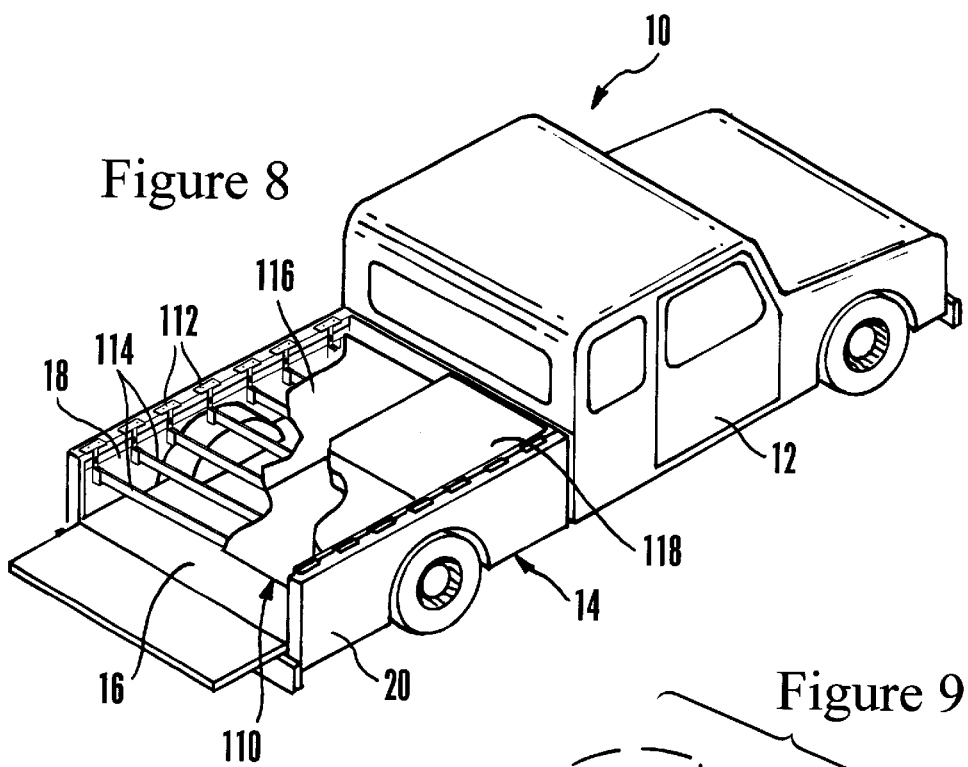
FIG. 8 is a perspective view of the pickup truck with the tent removed to reveal a tent platform assembly.
Figure 9:
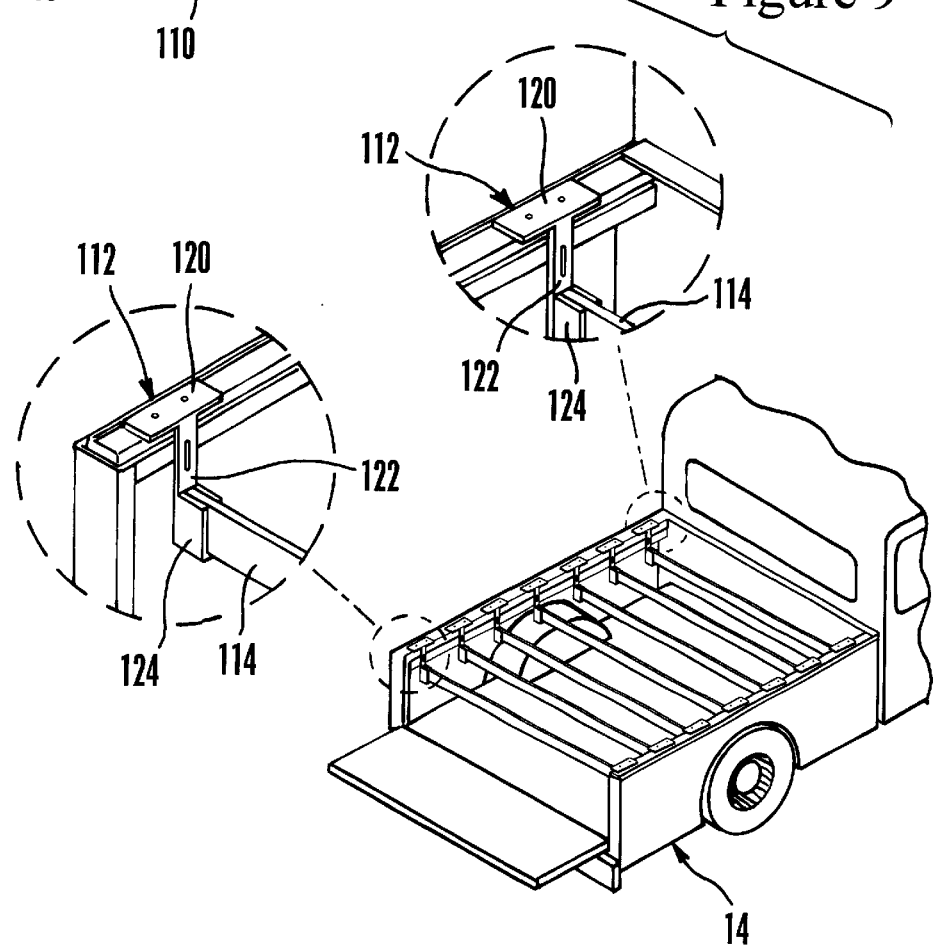
FIG. 9 is a detail view of the connection of the platform assembly to the pickup truck.
Figure 10:
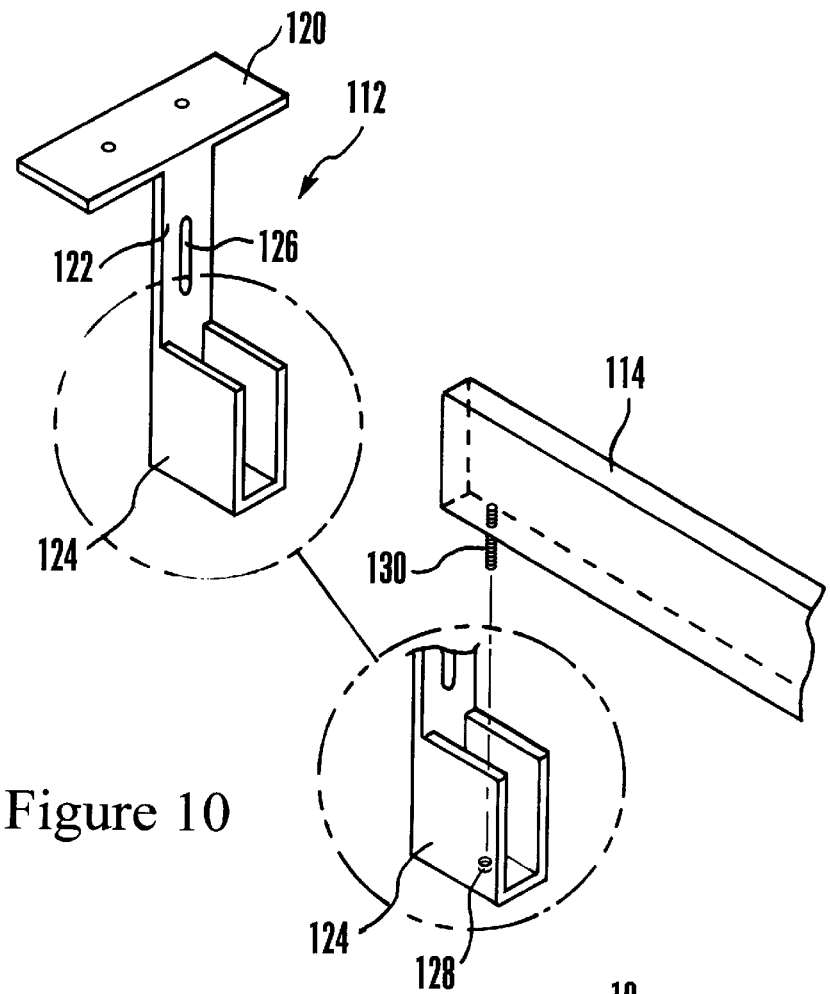
FIG. 10 is an exploded detail view of the connection between the platform assembly support bracket and corresponding slat.

Referring now to FIGS. 8 through 10, a preferred platform assembly, generally designated 110, is shown installed in the cargo box 14 of the pickup truck 10. FIG. 8 shows that the platform assembly 110 includes plural brackets 112 that are equally spaced along the sidewalls 18, 20 of the cargo box 14. Plural slats 114 span the interior width of the cargo box 14 between the sidewalls 18, 20. The slats 114 are supported at each end by a bracket 112. Preferably, the slats 114 are parallel to each other and to the forward wall 22 of the cargo box 14. As shown in FIG. 8, a structural layer 116 of material, e.g., plywood, particle board, etc., can be attached to the top of the slats 114. In turn, a cushioned layer 118 can be installed on top of the structural layer 116.

It is to be appreciated that the tent assembly 26 can be attached to the cargo box 14 over the platform assembly 110. Thus, the platform assembly 110 provides a comfortable base structure for the tent assembly 26. Moreover, since the platform assembly 110 is suspended within the cargo box 14, the space established between the platform assembly 110 and the floor 16 of the cargo box 14 can be used as storage space, e.g, for camping gear.

FIGS. 9 and 10 show details regarding the brackets 112, the slats 114 and the connection therebetween. As shown in FIGS. 9 and 10, each bracket 112 includes a horizontal top flange 120 that is bolted or otherwise attached to the top of the cargo box sidewalls 18, 20. A vertical section 122 extends downwardly from the inner edge of the top flange 120. It is to be understood that the vertical section 122 is perpendicular to the top flange 120. FIGS. 9 and 10 further show that a slat connector 124 is attached to the bottom of the vertical section 122. The slat connector 124 is sized and shaped to receive the correspondingly sized and shaped end of a slat 114. The bracket 112 also includes a vertical slot 126 formed in the vertical section 122. A connector (not shown), e.g., a bolt, may be installed in the vertical slot 122 to further constrain the motion of the bracket 112. As shown, the slat connector 124, in one embodiment, is formed with a bore 128 into which a dowel pin 130 extending from the slat 114 fits in order to constrain the motion of the slat 114 relative to the bracket 112.

Figure 11:
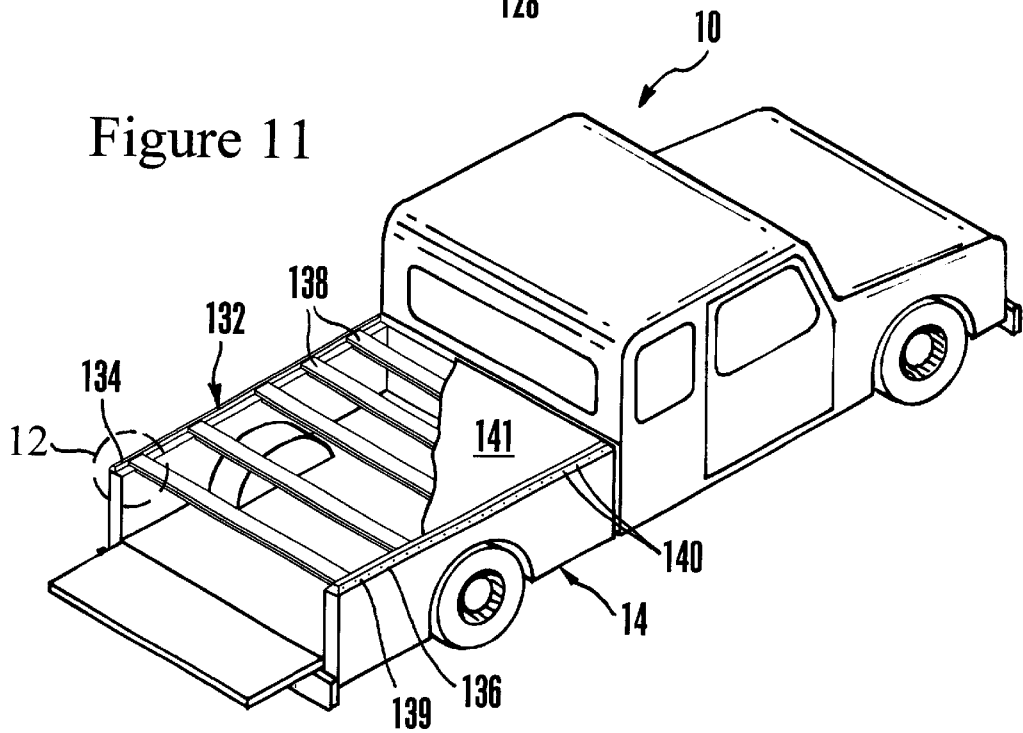
FIG. 11 is a perspective view of the pickup truck with the tent removed to reveal an alternative tent platform assembly.

Referring to FIG. 11, an alternative embodiment of the platform assembly, generally designated 132, is shown attached to the top of the cargo box 14. FIG. 11 shows that the platform assembly 132 includes a left side rail 134 and a right side rail 136 installed along the length of the top of the cargo box sidewalls 18, 20. Plural slats 138 span from the left cargo box sidewall 18 to the right cargo box sidewall 20 between the rails 134, 136. Preferably, the slats 138 are perpendicular to the rails 134, 136 and parallel to the forward wall 22 of the cargo box 14. As shown in FIG. 11, the each rail 134 includes an outer surface 139 to which plural snap fasteners 140 are installed. These snap fasteners 140 facilitate the installation of a cover, described below, or the tent assembly 26 to the cargo box 14. A structural layer 141 can be installed on top of the slats 138 to provide a base for a tent assembly 26 installed on the cargo box 14 over the platform assembly 132.

Figure 12:
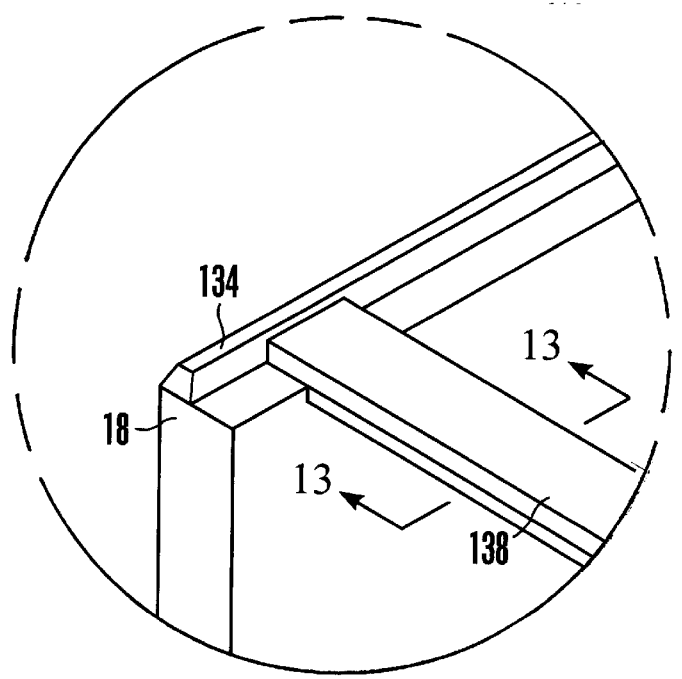
FIG. 12 is detail view of the connection between the alternative platform assembly to the pickup truck as indicated by circle 12 in FIG. 11.
Figure 13:
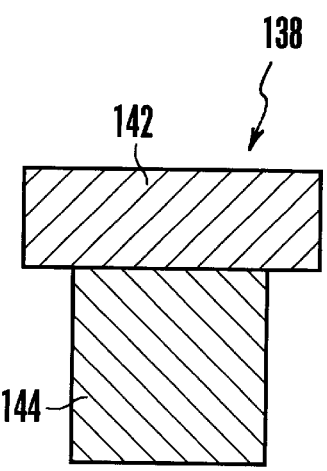
FIG. 13 is a cross-section view of the platform assembly slat taken along line 13—13 in FIG. 12.

FIG. 12 shows details of the connection between the cargo box 14 and the slats 138 of the alternative platform assembly 132. As shown, each slat 138 forms a lip or extension that fits over the top of the cargo box sidewall 18 and connects to the interior part of the rail 134. Referring to FIG. 13, it is shown that each slat 138 includes a horizontal upper member 142 and a vertical lower member 144 that are attached to each other to form a slat 138 having a generally "T"-shaped cross-section.

Figure 14:
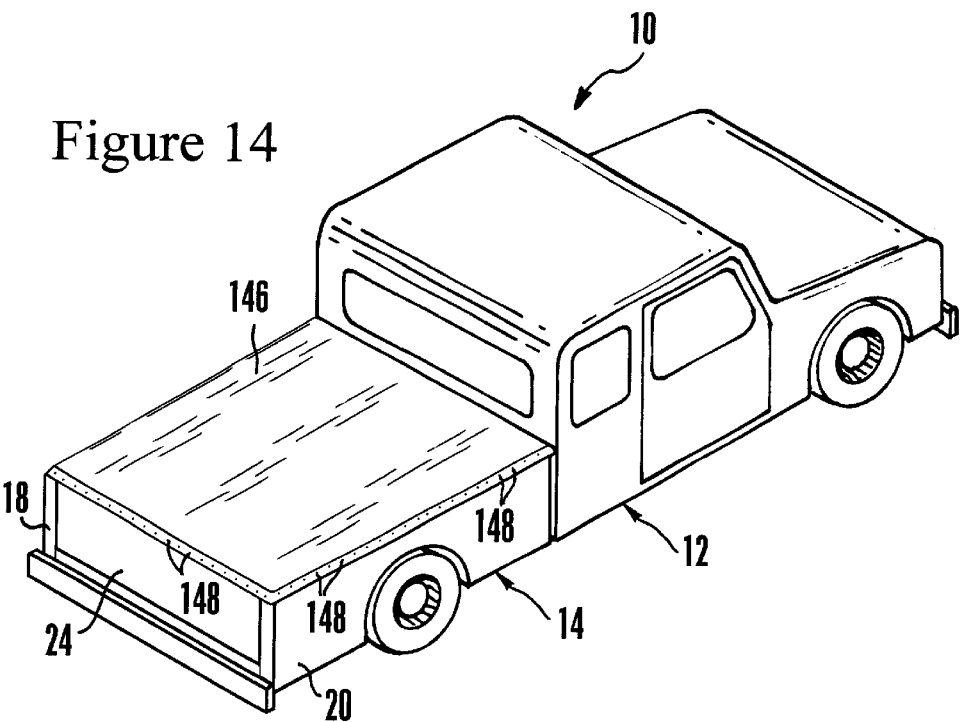
FIG. 14 is perspective view of the pickup truck with a travel cover installed over the cargo box.

FIG. 14 shows a preferably rain resistant travel cover, generally designated 146, installed over the cargo box 14 of the pickup truck 10 to protect the items under to the cover 146 and inside the cargo box 14 while the truck is traveling to and from a camp site. As shown in FIG. 14, plural snap fasteners 148 are used to attach the cover 146 to the cargo box 14.

With the configuration of structure described above, it is to be appreciated that the tent assembly 26 can be removably attached to the cargo box 14 of a pickup truck 10 to provide a temporary shelter while camping. The tent assembly 26 extends along the entire length of the cargo box 14 and across the opened tailgate 24. With the addition of the platform assembly 110, adequate storage space is provided beneath the tent assembly 26 and the platform assembly 110.

While the particular PICKUP TRUCK TENT CAMPING SYSTEM as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A tent assembly removably attached to a pickup truck having a cargo box, the cargo box having a left sidewall, a right sidewall, a forward wall therebetween, and a tailgate installed between the sidewalls, the tent assembly comprising:

a center section defining a top, a left sidewall, and a right sidewall, the left sidewall and the right sidewall including an inner side flap and an outer side flap, the inner side flap and the outer side flap being draped over respective cargo box sidewalls and attached thereto, the left sidewall and right sidewall of the tent extending from the forward wall of the cargo box, along the length of the cargo box, and across the tailgate when the tailgate is in an open horizontal position;

means for anchoring the tent assembly to the tailgate in the open position;

at least a forward tent pole sleeve having a forward tent pole disposed therein, the forward tent pole being inclined forward at an angle with respect to the vertical when the tent assembly is erected in the cargo box;

at least a center tent pole sleeve having a center tent pole sleeve disposed therein; and at least an aft tent pole sleeve having an aft tent pole sleeve disposed therein, the aft tent pole sleeve being inclined aft with respect to the vertical when the tent assembly is erected in the cargo box.

2. The tent assembly of claim 1, wherein the forward tent pole angle is inclined at a forward tent pole angle of between ten degrees to thirty degrees (10°–30°) and the aft tent pole angle is inclined at an aft tent pole angle of between ten degrees to thirty degrees (10°–30°).

3. The tent assembly of claim 2, wherein the center tent pole is perpendicular with respect to the horizontal.

4. The tent assembly of claim 1, wherein the left sidewall and the right side wall of the cargo box includes an interior lip and each inner side flap includes means for attaching the inner side flap to the interior lip of the left sidewall and the right sidewall of the cargo box.

5. The tent assembly of claim 4, further comprising means for attaching the outer side flaps to the cargo box.

6. A tent assembly removably attached to a pickup truck having a cargo box and a cargo box liner disposed therein, the cargo box having a left sidewall, a right sidewall, a forward wall therebetween, and a tailgate installed between the sidewalls, the tent assembly comprising:

a center section defining a top, a left sidewall, and a right sidewall, the left sidewall and the right sidewall including an inner side flap and an outer side flap, the inner side flap and the outer side flap being draped over respective cargo box sidewalls and attached thereto, the inner side flaps having means for attaching each inner side flap to the cargo box liner, the tent sidewalls extending from the forward wall of the cargo box, along the length of the cargo box, and across the tailgate when the tailgate is an open horizontal position; and means for anchoring the tent assembly to the tailgate in the open position.

7. The tent assembly of claim 6, wherein the means for anchoring the tent assembly to the tailgate when the tailgate is in the open position includes a horizontal flap connected to the tent sidewalls and installed beneath the tailgate when the tailgate is in the open position.

8. A tent assembly removably attached to a pickup truck having a cargo box and a cargo box liner disposed therein, the cargo box having a left sidewall, a right sidewall, a forward wall therebetween, and a tailgate installed between the sidewalls, the tent assembly comprising:

a center section defining a top, a left sidewall, a right sidewall, a forward end, and an aft end, the left sidewall and the right sidewall including an inner side flap and an outer side flap, the inner side flap and the outer side flap being draped over respective cargo box sidewalls and attached thereto, the inner side flaps having means for attaching each inner side flap to the cargo box liner, the tent sidewalls extending from the forward wall of the cargo box, along the length of the cargo box, and across the tailgate when the tailgate is an open horizontal position;

a forward section attached to forward end of the center section to enclose the forward end of the center section;

an aft section attached to the aft end of the center section to enclose the aft end of the center section;

means for anchoring the tent assembly to the tailgate in the open position; and means for anchoring the forward section of the tent assembly to the cargo box.

9. The tent assembly of claim 8, wherein the means for anchoring the forward section of the tent assembly includes an outer flap draped over the front wall of the cargo box and attached thereto.

10. A tent assembly removably attached to a pickup truck having a cargo box and a cargo box liner disposed therein, the cargo box having a left sidewall, a right sidewall, a forward wall therebetween, and a tailgate installed between the sidewalls, the tent assembly comprising:

a center section defining a top, a left sidewall, and a right sidewall, the left sidewall and the right sidewall including an inner side flap and an outer side flap, the inner side flap and the outer side flap being draped over respective cargo box sidewalls and attached thereto, the inner side flaps having means for attaching each inner side flap to the cargo box liner, the tent sidewalls extending from the forward wall of the cargo box, along the length of the cargo box, and across the tailgate when the tailgate is an open horizontal position;

means for anchoring the tent assembly to the tailgate in the open position; a side screen incorporated into the left sidewall and the right sidewall of the tent; an aft section having an aft screen and door panel incorporated into the aft section; and a forward screen and a cab access panel incorporated into the forward section.

11. A pickup truck tent camping system, for use in conjunction with a pickup truck having a cargo box that includes a floor, a left sidewall and a right sidewall extending from the floor, a forward wall attached to the left sidewall and the right sidewall of the cargo box, -ad a tailgate disposed between the left sidewall and the right sidewall of the cargo box, the tent camping system comprising:

at least a platform assembly installed in the cargo box, the platform assembly being suspended from the left sidewall and right sidewall of the cargo box above the floor of the cargo box such that a storage space is established under the platform assembly;

at least a tent assembly installed over the platform assembly, the tent assembly including a center section defining a top, a left sidewall, and a right sidewall, the left sidewall and the right sidewall of the tent including an inner side flap and an outer side flap, the inner side flap and the outer side flap being draped over the corresponding left sidewall and the right sidewall of the cargo box and attached thereto, the left sidewall and right sidewall of the tent extending from the forward wall of the cargo box, along the length of the cargo box, and across the tailgate when the tailgate is an open horizontal position; and at least a tent cover installed over the tent assembly.

12. The system of claim 11, further comprising: means for anchoring the tent assembly to the tailgate in the open position.

13. The tent assembly of claim 12, wherein the means for anchoring the tent assembly to the tailgate when the tailgate is in the open position includes a horizontal flap connected to the tent sidewalls and installed beneath the tailgate when the tailgate is in the open position.

14. The system of claim 13, wherein the tent assembly further comprises:

at least a forward tent pole sleeve having a forward tent pole disposed therein, the forward tent pole being inclined forward at an angle with respect to the vertical when the tent assembly is erected in the cargo box;

at least a center tent pole sleeve having a center tent pole sleeve disposed therein; and at least an aft tent pole sleeve having an aft tent pole sleeve disposed therein, the aft tent pole sleeve being inclined aft with respect to the vertical when the tent assembly is erected in the cargo box.

15. The system of claim 14, wherein the forward tent pole angle is inclined at a forward tent pole angle of between ten degrees to thirty degrees (10°–30°) and the aft tent pole angle is inclined at an aft tent pole angle of between ten degrees to thirty degrees (10°–30°).

16. The system of claims 15, wherein the center tent pole is perpendicular with respect to the horizontal.

17. The system of claim 12, wherein the left sidewall and the right sidewall of the cargo box includes an interior lip and each inner side flap includes means for attaching each inner side flap to the interior lip of the left sidewall and the right sidewall of the cargo box.

18. The system of claim 17, further comprising means for attaching the outer flaps to the cargo box.

19. The system of claim 12, wherein the pickup truck further includes a cargo box liner installed in the cargo box, and each inner side flap includes means for attaching each inner side flap to the cargo box liner.

20. The system of claim 12, wherein the tent assembly further comprises:

a forward section attached to a forward end of the center section to enclose the forward end of the center section;

an aft section attached to an aft end of the center section to enclose the aft end of the center section; and means for anchoring the forward section of the tent assembly to the cargo box.

21. The system of claim 20, wherein the tent assembly further comprises a side screen incorporated into the left sidewall and the right sidewall of the tent.

22. The system of claim 21, wherein the aft section further comprises an aft screen and a door panel incorporated into the aft section.

23. The system of claim 22, wherein the tent assembly further comprises a forward screen and a cab access panel incorporated into the forward section.

24. The system of claim 23, wherein the tent cover comprises:

a center tent cover section;

a forward tent cover extension extending forward from the center section; and an aft tent cover extension extending from the center section of the tent cover beyond the aft section of the tent assembly.

25. The system of claim 24, wherein the tent cover further comprises:

a seam near the midpoint of the center tent cover section, the seam being openable to expose the side screens of the tent assembly.

* * * * *

UNITED STATES PATENT AND TRADEMARK OFFICE
CERTIFICATE OF CORRECTION

PATENT NO. : 6,481,784 B2
DATED : November 19, 2002
INVENTOR(S) : Lee B. Cargill It is certified that error appears in the above-identified patent and that said Letters Patent is hereby corrected as shown below:

<u>Column 8,</u>
Lines 4 & 6 delete "sleeve"

Signed and Sealed this

Eighteenth Day of November, 2003

JAMES E. ROGAN
*Director of the United States Patent and Trademark Office*